C. GASKILL.
HAND HOOK.
APPLICATION FILED MAR. 20, 1914.
1,116,688.
Patented Nov. 10, 1914.
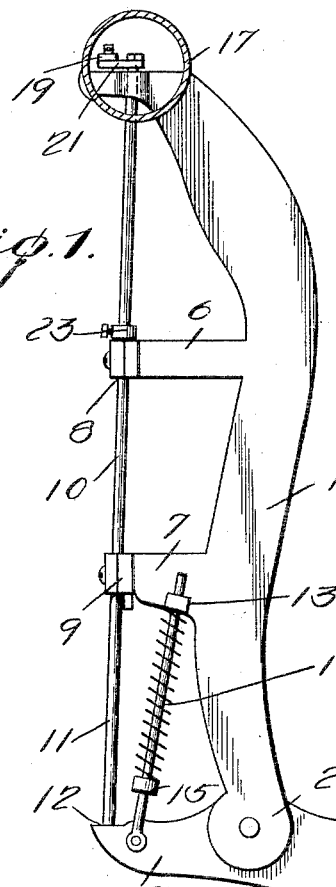
Fig. 1.
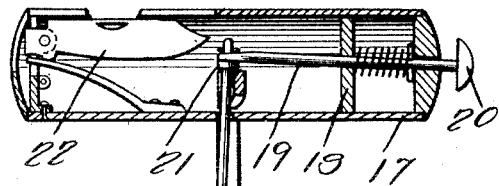
Fig. 2.
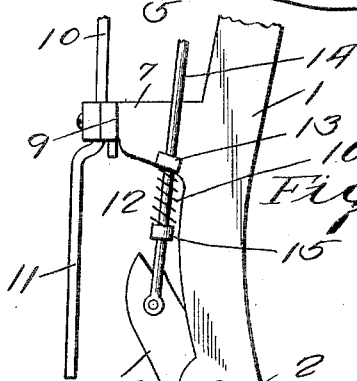
Fig. 3.
Fig. 4.
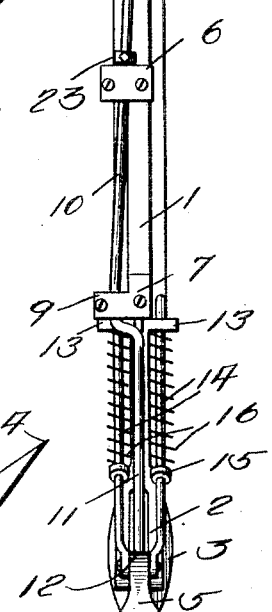
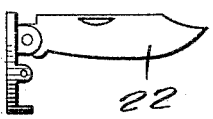
Fig. 5.
Inventor
C. Gaskill
Witnesses
By
Attorney
THE NORRIS PETERS CO., PHOTO-LITHO., WASHINGTON, D. C.

UNITED STATES PATENT OFFICE.

CHARLES GASKILL, OF CORDOVA, TERRITORY OF ALASKA.

HAND-HOOK.

1,116,688.  Specification of Letters Patent. Patented Nov. 10, 1914.

Application filed March 20, 1914. Serial No. 826,093.

*To all whom it may concern:*

Be it known that I, CHARLES GASKILL, a citizen of the United States, residing at Cordova, Territory of Alaska, have invented certain new and useful Improvements in Hand-Hooks; and I do hereby declare the following to be a full, clear, and exact description of the invention, such as will enable others skilled in the art to which it appertains to make and use the same.

The present invention is directed to hand hooks, and has for its object to so construct a device of this character that handling of bales or the like is facilitated.

A further object of the invention is to so construct a device of this character that the bill thereof can be readily disengaged from the bale without the necessity of the operator removing his hand from the handle.

With these and other objects in view, this invention resides in the novel features of construction, formation, combination and arrangement of parts to be hereinafter more fully described, claimed and illustrated in the accompanying drawing, in which:—

Figure 1 is a side elevation of the device partly in section; Fig. 2, is a rear view partly in section; Fig. 3, is a fragmentary view showing the bill in its tripped position; Fig. 4, a detail view of the knife mounted in the hollow handle, and Fig. 5, an end view of what is shown in Fig. 4.

The device comprises a shank 1, the lower end of which is provided with furcations 2 between which is pivoted the bill 3, said bill having one end pointed, as at 4, for penetrating a bale or the like. The other end of the bill terminates in an extension 5, the purpose of which will appear later.

Formed integral with the shank 1 are upper and lower arms 6 and 7, respectively, the former being provided with a guide opening 8 while the latter is provided with a perforated lug 9. Journaled in the guide 8 and lug 9 is a vertical shaft 10, the lower end of which terminates in a crank arm 11, said crank arm being designed to normally have its lower end engaged with the seat 12 formed upon the extension 5, thereby holding the bill in its operative position. The arm 7 is also provided with slotted lugs 13 which are slidably engaged by the upper ends of the links 14, the lower ends of which are pivotally connected upon opposite sides of the extension 5. The links 14 are provided with stops 15 which are engaged by the lower ends of the coil springs 16, said springs having their upper ends engaged against the lugs 13, said springs serving to return the bill to its normal position after being tripped.

The upper end of the shank 1 is passed through the center of the tubular handle 17, said handle having mounted therein a partition 18, in which is slidably mounted the spring pressed rod 19, the outer end of which is provided with a button 20. The inner end of the rod 19 is pivotally connected to the crank arm 21 formed integral with the upper end of the shank 10. Also mounted in the handle 17 is a knife blade 2, which may be employed for cutting twine or for any other purpose desired.

In operation the bill 4 is embedded in the bale in the usual manner, and when it is desired to disengage the bill from the bale it is only necessary for the user to exert pressure upon the button 20, thus, through the medium of the crank arm 21 the shaft 10 is partially rotated, whereby the lower end of the crank arm 11 disengages the seat 12. Upon total disengagement of the bill from the bale the springs 16 will return the same to its normal position, while the shaft 10 will be returned to its normal position upon the operator relieving pressure upon the button 20. The vertical shaft 10 is provided with a lug 23, which serves to prevent the same from moving downwardly.

What is claimed is:—

A hook of the class described, comprising a shank, a bill pivotally connected to the lower end thereof, a handle fixed to the upper end of said shank, a shaft journaled longitudinally of the shank, said shaft having crank arms formed from its upper and lower ends, an extension formed upon one end of the bill, a seat carried by the extension and normally engaged by the lower end of the lowermost crank arm, a spring pressed rod slidably supported by the handle and having one end pivotally connected to the uppermost crank arm of the shaft, said rod when moved in one direction serving to rock the shaft so that the lower crank arm thereof disengages said seat, whereby the bill swings to its inoperative position, and means for returning the bill and shaft to their operative positions.

In testimony whereof, I affix my signature, in the presence of two witnesses.

CHARLES GASKILL.

Witnesses:
A. H. ZIEGLER,
W. J. FITZGIBBONS.

Copies of this patent may be obtained for five cents each, by addressing the "Commissioner of Patents, Washington, D. C."